(12) United States Patent
Boysen

(10) Patent No.: US 10,340,809 B2
(45) Date of Patent: Jul. 2, 2019

(54) BIDIRECTIONAL DC-DC RESONANT CONVERTER

(71) Applicant: Eltek AS, Drammen (NO)

(72) Inventor: Kjetil Boysen, Flekkerøy (NO)

(73) Assignee: Eltek AS, Drammen (NO)

( * ) Notice: Subject to any disclaimer, the term of this patent is extended or adjusted under 35 U.S.C. 154(b) by 0 days.

(21) Appl. No.: 16/072,704

(22) PCT Filed: Feb. 3, 2017

(86) PCT No.: PCT/EP2017/052394
§ 371 (c)(1),
(2) Date: Jul. 25, 2018

(87) PCT Pub. No.: WO2017/134232
PCT Pub. Date: Aug. 10, 2017

(65) Prior Publication Data
US 2019/0089260 A1 Mar. 21, 2019

(30) Foreign Application Priority Data

Feb. 4, 2016 (GB) .................................. 1602044.8

(51) Int. Cl.
*H02M 3/335* (2006.01)
*H02M 7/48* (2007.01)
*H02M 1/42* (2007.01)
*H02M 1/00* (2006.01)

(52) U.S. Cl.
CPC ......... *H02M 3/33584* (2013.01); *H02M 7/48* (2013.01); *H02M 1/4241* (2013.01);
(Continued)

(58) Field of Classification Search
CPC ........... H02M 1/4241; H02M 3/33523; H02M 3/33584
(Continued)

(56) References Cited

U.S. PATENT DOCUMENTS 3,906,337 A * 9/1975 Depenbrock ........... H02M 1/15
363/126
4,959,766 A * 9/1990 Jain ..................... H02M 1/4241
363/126
(Continued)

FOREIGN PATENT DOCUMENTS

CN 105024551 A 11/2015
GB 2484970 A 5/2012
(Continued)

OTHER PUBLICATIONS

International Search Report issued in PCT/EP2017/052394 dated Apr. 10, 2017 (2 pages).
(Continued)

Primary Examiner — Gary A Nash
(74) Attorney, Agent, or Firm — Osha Liang LLP

(57) ABSTRACT

A bi-directional DC-DC resonant converter with bi-directional voltage control includes: primary converter terminals defining a primary voltage; secondary converter terminals defining a secondary voltage; a transformer device having primary transformer terminals and secondary transformer terminals; a resonant tank device having first and second primary resonant tank terminals defining a primary resonant tank voltage and first and second secondary resonant tank terminals defining a secondary resonant tank voltage, wherein the primary tank terminals are connected to the secondary transformer terminals; a primary switching circuit connected between the primary converter terminals and the primary transformer terminals; and a secondary switching circuit connected between the secondary resonant tank terminals and the secondary converter terminals.

17 Claims, 8 Drawing Sheets

(52) U.S. Cl.
CPC .................. *H02M 3/33523* (2013.01); *H02M 2001/0048* (2013.01); *H02M 2001/0058* (2013.01); *H02M 2007/4818* (2013.01); *Y02B 70/1433* (2013.01); *Y02B 70/1441* (2013.01); *Y02B 70/1491* (2013.01)

(58) Field of Classification Search
USPC ............................................... 363/21.02, 78
See application file for complete search history.

(56) References Cited

U.S. PATENT DOCUMENTS

| | | | |
|---|---|---|---|
| 2007/0070655 A1* | 3/2007 | Eguchi | H02M 1/10 363/17 |
| 2007/0109708 A1* | 5/2007 | Hussman | H02J 1/00 361/113 |
| 2011/0317452 A1 | 12/2011 | Anguelov et al. | |
| 2014/0268892 A1* | 9/2014 | Zhou | H02M 3/33592 363/17 |

FOREIGN PATENT DOCUMENTS

| | | |
|---|---|---|
| JP | 2012-070491 A | 4/2012 |
| JP | 2014-079108 A | 5/2014 |
| WO | 2011/074977 A3 | 3/2012 |
| WO | 2013/095161 A3 | 11/2013 |
| WO | 2016/012032 A1 | 1/2016 |

OTHER PUBLICATIONS

Written Opinion issued in PCT/EP2017/052394 dated Apr. 10, 2017 (7 pages).
United Kingdom Intellectual Property Office Search Report issued in Patent Application No. GB1602044.8 dated Mar. 14, 2016 (4 pages).

\* cited by examiner

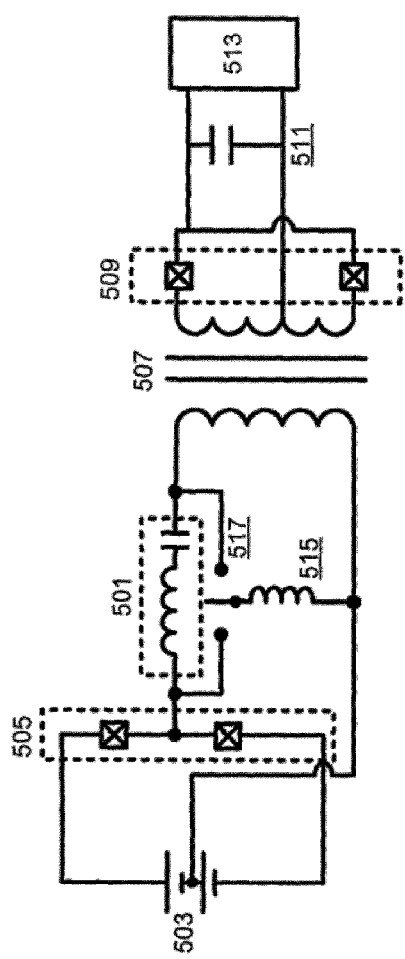
Fig. 1a: Prior art (Fig. 5 WO 2013/095161)
Fig. 1c: Power flow from right to left
Fig. 1b: Power flow from left to right

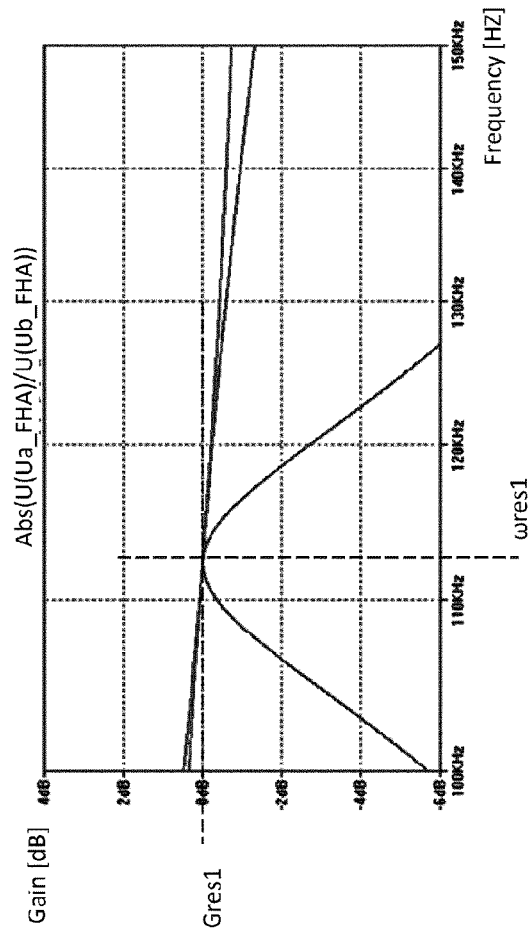
Fig.3b
Fig.3c
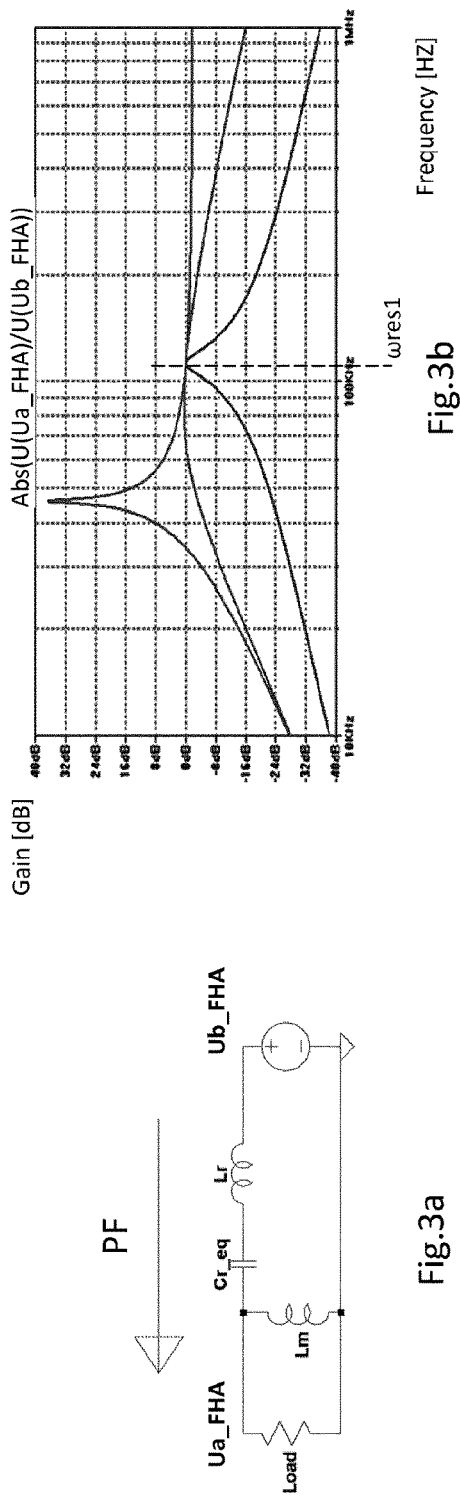
Fig.3a

BIDIRECTIONAL DC-DC RESONANT CONVERTER

FIELD OF THE INVENTION

The present invention relates to a bi-directional resonant converter with bi-directional voltage control. More specifically, the invention relates to a bi-directional converter with galvanic isolation.

BACKGROUND OF THE INVENTION

DC-DC converters are typically used to convert an uncontrolled input DC voltage to a controlled output DC voltage and supply the controlled output DC voltage to a load. The DC-DC converters are also providing galvanic insulation between the input side and the output side.

WO2011/074977 describes a resonant DC-DC converter with a resonant tank having a transformer, where a switching device is provided for reconfiguring the secondary windings of the transformer between a star configuration and a delta configuration.

Also bi-directional DC-DC converters exist. Such bi-directional DC-DC converters may be used in uninterruptable power supplies (UPS), energy storage applications for renewable energy sources such as solar power, wind power—

US 2011/0317452 describes a bi-directional DC-DC resonant converter with lossless (soft) switching with controlled voltage level in both directions. This is achieved by the addition of an inductor Lnew in the different converter circuits in this publication. The disadvantage of these circuits is that the additional inductor Lnew will increase the power losses and hence reduce the power efficiency.

WO 2013/095161 describes a LLC bidirectional resonant converter comprising: a resonant tank, a first switching circuit connected to the resonant tank via first power conduits, a second switching circuit connected to the resonant tank via second power conduits, a switching element, and at least one switchable inductive element which is arranged by the switching element to be in parallel across the second power conduits when operating in a first mode of operation and arranged by the switching element to be in parallel across the first power conduits when operating in a second mode of operation.

FIG. 1a of the present application shows FIG. 5 of WO 2013/095161. Here, the switching element 517 is switching the resonant circuit between the states shown in FIG. 1b and FIG 1c respectively. In the first state, when power is transferred from left side to right side, the resonant circuit is a commonly known LLC resonant tank, and in the second state, when power is transferred from right side to left side, the resonant circuit is also a commonly known LLC resonant tank. Here, assuming that the transformer ratio is 1:1, the gain (i.e. the relation between the primary side voltage and the secondary side voltage) will have the same gain for all frequencies for both FIG. 1a and FIG. 1c. This could be a disadvantage in applications with battery back-up, where the battery voltage might be different depending on charging or discharging of the battery.

One object of the invention is to provide a bi-directional DC-DC resonant converter which in particular is suitable for charging and discharging batteries in renewable power system applications.

The object of the invention is to provide an improved bi-directional DC-DC resonant converter. As for all types of converters, it is desired that the power efficiency is high (i.e. low losses), and that the costs are low.

SUMMARY OF THE INVENTION

In particular, the object of the invention is to improve the functionality of the bi-directional DC-DC resonant converter when the optimal relation between the voltages connected to the converters primary and secondary terminals changes depending on the direction of the power flow. This is done by switching between two different resonant circuits that have different resonant frequencies and different DC gain at their respective resonant frequency.

According to the invention, this is achieved by a bi-directional DC-DC resonant converter comprising a bi-directional DC-DC resonant converter with bi-directional voltage control, comprising:
  primary converter terminals defining a primary voltage;
  secondary converter terminals defining a secondary voltage;
  a transformer device having primary transformer terminals and secondary transformer terminals;
  a resonant tank device having first and second primary resonant tank terminals defining a primary resonant tank voltage and first and second secondary resonant tank terminals defining a secondary resonant tank voltage, where the primary tank terminals are connected to the secondary transformer terminals;
  a primary switching circuit connected between the primary converter terminals and the primary transformer terminals;
  a secondary switching circuit connected between the secondary resonant tank terminals and the secondary converter terminals;
where the resonant tank device comprises a configuration switch for configuration of the converter between a first state, in which power is transferred from the secondary converter terminals to the primary converter terminals and a second state, in which power is transferred from the primary converter terminals to the secondary converter terminals;
where the resonant tank device comprises a resonant inductor, a magnetizing inductor and a resonant capacitor connected to the configuration switch;
  where a first gain Gres1 is defined as the ratio between a first harmonic approximation of the secondary resonant tank voltage and a first harmonic approximation of the primary resonant tank voltage when operating at a first series resonance frequency ($\omega_{res1}$) in the first state.

The bi-directional DC-DC resonant converter is characterized in that a second gain is defined as the ratio between a first harmonic approximation of the secondary resonant tank voltage and a first harmonic approximation of the primary resonant tank voltage when operating at a second series resonance frequency ($\omega_{res2}$) in the second state; where the first gain is different from the second gain.

Hence, the bi-directional DC-DC resonant converter has the first gain when operating in the first state and has the second gain when operating in the second state.

In one aspect of the invention, the second series resonant frequency ($\omega_{res2}$) during the first harmonic approximation in the second state is different from the first resonant series frequency ($\omega_{res1}$) during the first harmonic approximation in the first state.

In one aspect of the invention, the first gain is equal to 1 when operating at the first series resonance frequency ($\omega_{res1}$) in the first state.

In one aspect of the invention, the second gain is determined by the inductance of the resonant inductor and inductance of the magnetizing inductor so that the second gain is equal to (Lr+Lm)/Lm when operating at the second series resonance frequency ($\omega_{res}2$) in the second state.

In one aspect of the invention, the transformer device has a primary winding connected to the primary transformer terminals and a secondary winding connected to the secondary transformer terminals.

In one aspect of the invention, the configuration switch comprises a first switch terminal, a second switch terminal and a third switch terminal.

In one aspect of the invention, the magnetizing inductor is connected between the first switch terminal and the first primary resonant tank terminal.

In one aspect of the invention, the second switch terminal is connected to the second primary resonant tank terminal.

In one aspect of the invention, the resonant capacitor is connected between the second and third switch terminals.

In one aspect of the invention, the resonant inductor is connected between the third switch terminal and the second secondary resonant tank terminal.

In one aspect of the invention, the first primary resonant tank terminal is connected to the first secondary resonant tank terminal.

In one aspect of the invention, the resonant capacitor comprises a first resonant capacitor connected between the second primary resonant tank terminal and the first secondary converter terminals and a second resonant capacitor connected between the second primary resonant tank terminal and the second secondary converter terminals.

In one aspect of the invention, the resonant inductor is connected between first primary resonant tank terminal and the first secondary resonant tank terminal.

In one aspect of the invention, the third switch terminal is connected to the second secondary resonant tank terminal.

In one aspect of the invention, the first switch terminal and the second switch terminal are connected to each other in the first state; and where the first switch terminal and the third switch terminal are connected to each other in the second state.

In one aspect of the invention, the primary switching circuit is a full bridge circuit or a half bridge circuit.

The present invention also relates to a bi-directional DC-DC resonant converter as described above where:
the primary converter terminals are connected to a battery defining a battery voltage;
the secondary converter terminals are connected to a power supply system defining a system voltage;
where an optimal ratio between the system voltage and the battery voltage during charging is different from an optimal ratio between the system voltage and the battery voltage during discharging.

DETAILED DESCRIPTION

In the following, embodiments of the invention will be described in detail with reference to the enclosed drawings, where:

FIG. 1a illustrates a prior art DC-DC resonant converter which can be reconfigured between two states;

FIG. 1b illustrates the configuration of the resonant tank in the first state;

FIG. 1c illustrates the configuration of the resonant tank in the second state;

FIG. 3a illustrates a first harmonic approximation of the converter in the first state;

FIG. 3b illustrates a simulation of the resonant tank for three different load values in the first state;

FIG. 3c is an enlarged view of FIG. 4b illustrating the 0 dB gain at series resonance frequency $\omega$res1;

Figure 2A:
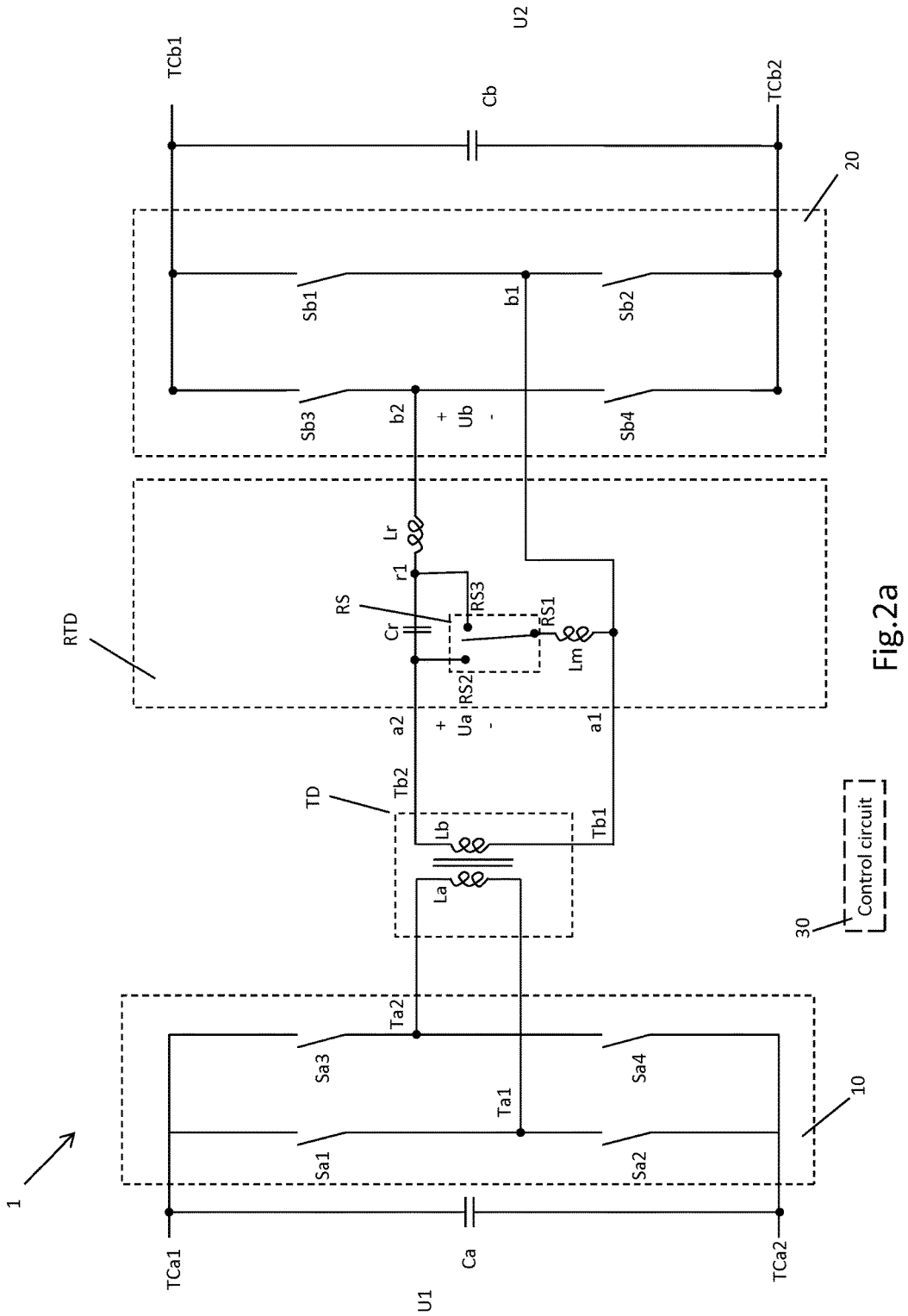
FIG. 2a illustrates the first embodiment of the invention.

It is now referred to FIG. 2a, where a bi-directional DC-DC resonant converter 1 with bi-directional voltage control has been shown.

The converter 1 comprises primary converter terminals TCa1, TCa2, i.e. a first primary converter terminal TCa1 and a second primary converter terminal TCa2, defining a primary voltage U1. Typically, a primary capacitor Ca is connected between these terminals TCa1, TCa2.

The converter 1 also comprises secondary converter terminals TCb1, TCb2, i.e. a first secondary converter terminal TCb1 and a second secondary converter terminal TCb2, defining a secondary voltage U. Typically, a secondary capacitor Cb is connected between these terminals TCb1, TCb2.

The converter 1 further comprises four main circuits indicated as dashed boxes in FIG. 2a. These main circuits are a transformer device TD, a resonant tank device RTD, a primary switching circuit 10 and a secondary switching circuit 20. These will be described in detail below.

The transformer device TD has primary transformer terminals Ta1, Ta2 and secondary transformer terminals Tb1, Tb2. The transformer device TD has a primary winding La connected to the primary transformer terminals Ta1, Ta2 and a secondary winding Lb connected to the secondary transformer terminals Tb1, Tb2.

The resonant tank device RTD has first and second primary resonant tank terminals a1, a2 defining a primary resonant tank voltage Ua and first and second secondary resonant tank terminals b1, b2 defining a secondary resonant tank voltage Ub. The primary tank terminals a1, a2 are connected to the secondary transformer terminals Tb1, Tb2.

The resonant tank device RTD comprises a resonant inductor Lr, a magnetizing inductor Lm and a resonant capacitor Cr connected to the configuration switch RS.

The primary switching circuit 10 is connected between the primary converter terminals TCa1, TCa2 and the primary transformer terminals Ta1, Ta2. The primary switching circuit 10 may be a full bridge circuit or a half bridge circuit. In FIG. 2a, it is shown that the primary switching circuit 10 is a full bridge circuit comprising four switches Sa1, Sa2, Sa3 and Sa4. The first switch Sa1 is connected between the first primary converter terminal TCa1 and the first primary tank terminal a1. The second switch Sa2 is connected between the first primary tank terminal a1 and the second primary converter terminal TCa2. The third switch Sa3 is connected between the first primary converter terminal TCa1 and the second primary tank terminal a2. The fourth switch Sa4 is connected between the second primary tank terminal a2 and the second primary converter terminal TCa2.

The secondary switching circuit 20 is connected between the secondary resonant tank terminals b1, b2 and the secondary converter terminals TCb1, TCb2. In FIG. 2a, it is shown that the secondary switching circuit 20 is a full bridge circuit comprising four switches Sb1, Sb2, Sb3, Sb4. The first switch Sb1 is connected between the first secondary converter terminal TCb1 and the first primary tank terminal a1. The second switch Sa2 is connected between the first secondary tank terminal a1 and the second secondary converter terminal TCb2. The third switch Sa3 is connected between the first secondary converter terminal TCb1 and the second secondary tank terminal a2. The fourth switch Sa4 is connected between the second secondary tank terminal a2 and the second secondary converter terminal TCb2.

The above-mentioned switches comprise semiconductor mosfets, wide bandgap transistors, or transistors with intrinsic diodes etc.

Similar to the prior art of FIG. 1a, the resonant tank device RTD comprises a configuration switch RS for configuration of the converter 1 between a first state, in which power is transferred from the secondary converter terminals TCb1, TCb2 to the primary converter terminals TCa1, TCa2, and a second state, in which power is transferred from the primary converter terminals TCa1, TCa2 to the secondary converter terminals TCb1, TCb2.

The configuration switch RS comprises a first switch terminal RS1, a second switch terminal RS2 and a third switch terminal RS3. The magnetizing inductor Lm is connected between the first switch terminal RS1 and the first primary resonant tank terminal a1. The second switch terminal RS2 is connected to the second primary resonant tank terminal a2.

In FIG. 2a, the resonant capacitor Cr is connected between the second and third switch terminals RS2, RS3. The resonant inductor Lr is connected between the third switch terminal RS3 and the second secondary resonant tank terminal b2. The first primary resonant tank terminal a1 is connected to the first secondary resonant tank terminal b1.

In FIG. 2a, a control circuit 30 is indicated in a dashed box. This control circuit 30 is connected to the switches Sa1, Sa2, Sa3, Sa4 of the primary switching circuit 10, to the resonant switch RS of the resonant tank device RTD and to the switches Sb1, Sb2, Sb3 and Sb4 of the secondary switching circuit 20. The control circuit 30 is controlling the switches based on frequency control, a method commonly used for LLC resonant DC-DC converters.

In FIG. 2a, the transformer ratio is 1:1. However, other transformer ratios are of course possible.

In a typical industrial application, the primary converter terminals TCa1, TCa2 will be connected to a storage device e.g. battery and/or an energy source, while the secondary converter terminals TCb1, TCb1 will be connected to a DC bus. To this DC bus, one or several of the following may be connected:

1) a bi-directional DC-AC converter, for converting power from the DC bus to an AC power supply system, for example a 230 VAC or a 400 VAC power supply system. This AC power supply system may then comprise both AC power producing capacity and AC load.
2) a DC load, for example telecommunication equipment, computer servers etc.
3) a DC power producing capacity, typically renewables such as solar cell systems, etc.

Figure 2B:
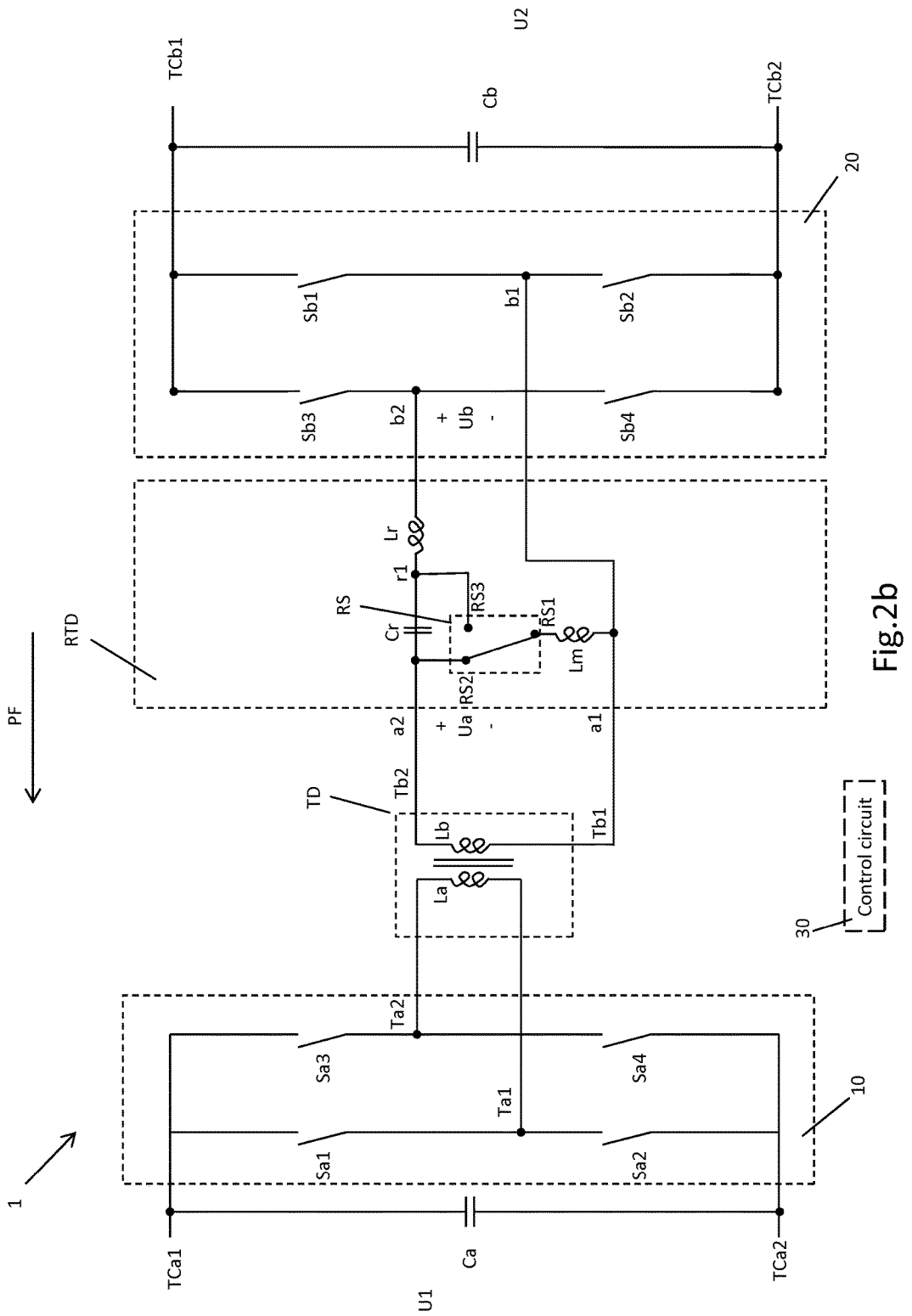
FIG. 2b illustrates the configuration of the DC-DC converter in the first state.

It is now referred to FIG. 2b. Here, the first state is shown, where power is flowing from the secondary converter terminals TCb1, TCb2 to the primary converter terminals TCa1, TCa2. Here, the control circuit 30 has controlled the resonant switch RS to connect the first switch terminal RS1 and the second switch terminal RS2 to each other.

The First Harmonic Approximation (FHA) is a commonly used modelling technique for analyzing the performance of resonant power converters. This type of approximation is commonly used, and is for example described in the following documents: "LLC resonant half-bridge converter design guideline", by Silvio De Simone of ST Microelectronics, Mar. 2014 and "LLC Resonant Converter Design using FAN7688", by Fairchild Semiconductor Corporation, 2015.

In FIG. 3a, a first harmonic approximation (often referred to as FHA) of the circuit of FIG. 2b is disclosed. Here, a first harmonic approximation of the voltage Ua, hereinafter referred to as Ua_FHA is represented as a voltage source (in the above example the battery) and a first harmonic approximation of the voltage Ub, hereinafter referred to as Ub_FHA is represented as a load (in the above example the DC bus). Accordingly, in the first state, the battery is charged. The resonance frequency ωres1 in this first state is here referred to as a first resonance frequency.

From FIG. 3a we see that the first series resonant frequency $\omega_{res1}$ can be computed based on values form, resonant inductor Lr and resonant capacitors Cr_eq according to the formula below:

$$\omega_{res1} = \frac{1}{2\pi(L_r * C_{r\_eq})}$$

As described above, the gain expressed as the absolute value of Ua_FHA/Ub_FHA at the first resonant frequency for the circuit in FIG. 2b is found to be:

$$Gres1 = \left|\frac{Ua\_FHA}{Ub\_FHA}\right|_{\omega_{res1}} = 1$$

In FIG. 3b, the control frequency for the switches is swept from 10 kHz to 1 MHz for three different load values. A series resonance frequency $\omega_{res1}$ is disclosed in FIG. 3b for the point where the gain (the absolute value of the first harmonic approximation Ua_FHA, over the first harmonic approximation Ub_FHA) is ideally equal to 1.

Figure 2C:
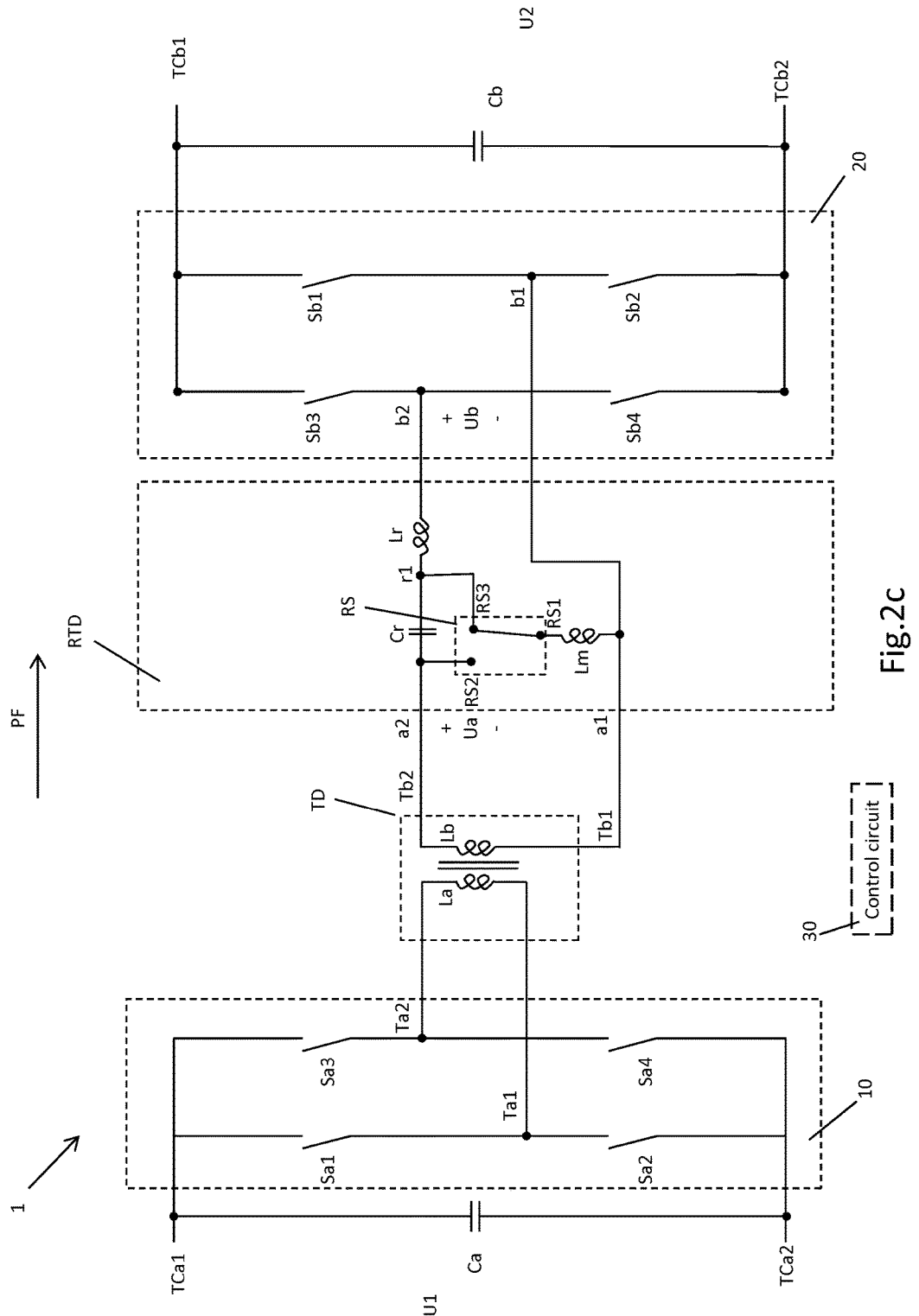
FIG. 2c illustrates the configuration of the DC-DC converter in the second state.

It is now referred to FIG. 2c. Here, the second state is shown, where power is flowing from the primary converter terminals TCa1, TCa2 to the secondary converter terminals TCb1, TCb2. Here, the control circuit 30 has controlled the resonant switch RS to connect the first switch terminal RS1 and the third switch terminal RS3 to each other.

Figure 4B:
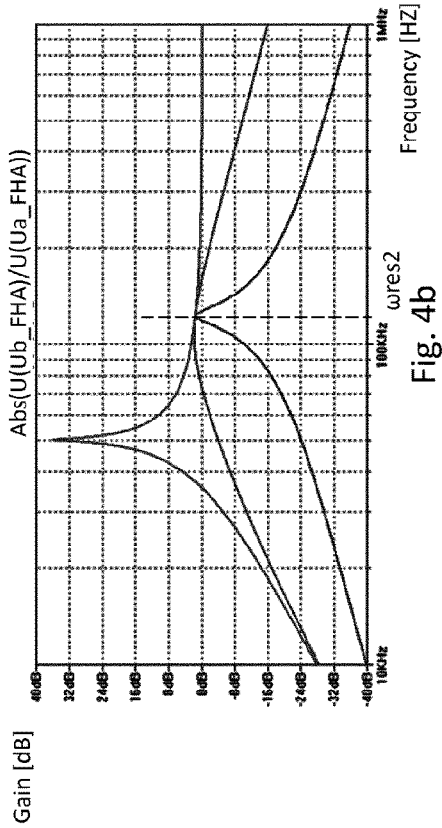
FIG. 4b illustrates a simulation of the resonant tank for three different load values in the second state.
Figure 4C:
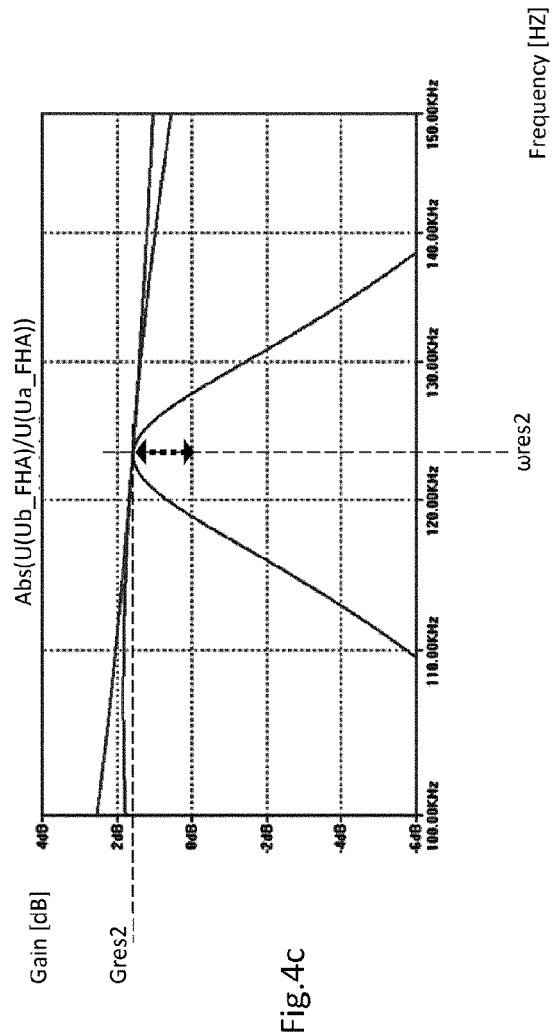
FIG. 4c is an enlarged view of FIG. 4b illustrating a substantial gain (1.6 dB) at series resonance frequency $\omega$res2.
Figure 4A:
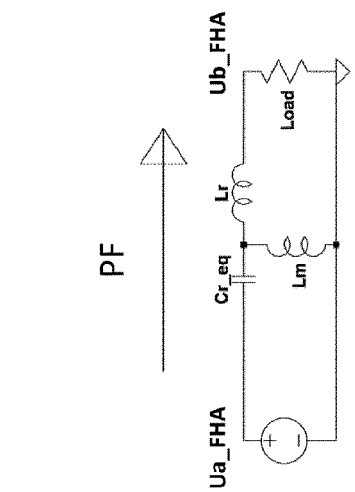
FIG. 4a illustrates a first harmonic approximation of the converter in the second state.

This situation is also illustrated in FIGS. 4a, 4b and 4c. In FIG. 4a, a first harmonic approximation of the circuit in FIG. 2c is shown. Here the first harmonic approximation Ua_FHA of the voltage Ua is represented as a power source (in the above example the battery) and the first harmonic approximation Ub_FHA of the voltage Ub is represented as a load (in the above example the DC bus). Accordingly, in the second state, the battery is discharged.

In FIG. 4b the resonance frequency $\omega_{res2}$ is found by sweeping the control frequency as described above. Due to the changed circuit configuration, the resonance frequency is here different than the above first resonant frequency. Hence, series resonance frequency $\omega_{res2}$ is here referred to as a second resonance frequency.

From FIG. 4a we see that the second resonant frequency $\omega_{res2}$ can be computed based on values from magnetizing inductor Lm, resonant inductor Lr and resonant capacitors Cr_eq:

$$\omega_{res2} = \frac{1}{2\pi(L_r \| L_m * C_{r\_eq})}$$

The gain at $\omega_{res2}$ for the circuit in FIG. 2c is found to be:

$$Gres2 = \left|\frac{Ub\_FHA}{Ua\_FHA}\right|_{\omega_{res2}} = 1 + \frac{L_r}{L_m}$$

The relation between Lr and Lm in FIG. 4a is Lr/Lm=0.2. According to the equation above this implies that the Gres2=1.2 at $\omega_{res2}$. In FIGS. 4b and 4c it is shown that the gain Gres2 at the second resonant frequency $\omega_{res2}$ is ca 1.6 dB that equals 10^(1.6/20)≈1.2

As shown above, the resonant tank device RTD has a second series resonant frequency $\omega_{res2}$ in the second state being different from the first series resonant frequency $\omega_{res1}$. Moreover, the ratio between the secondary voltage Ua and the primary voltage Ub in the first state is different from the ratio between the secondary voltage Ub and the primary voltage Ua in the second state.

EXAMPLE 1

In a first example, the bi-directional resonant LLC converter 1 has its secondary terminals TCb2, TCb2 connected to a fixed system voltage U2. Primary terminals TCa1, TCa2 are connected to a battery where the battery cells have following characteristics: Max charge voltage 3.65V per cell, working voltage during discharging 3.0V to 3.3V pr cell. The max charging voltage is in this case approximately 14-22% higher than the working discharging voltage of the battery. In charging mode power flows from Ub to Ua as shown in FIGS. 2b and 3a. In this case the converter is configured as a standard LLC. The LLC converter will have its best efficiency around the series resonant frequency Wrest where the gain is close to 1. The optimal voltage ratio between the fixed system voltage U2 and the needed charging voltage can be determined, and will result in a transformer ratio n. During discharging mode the battery cell voltage drops quickly to the working voltage level. The proposed bidirectional converter will now switch mode to second state as shown in FIGS. 2c and 4a. The gain of the resonant circuit is now 1+Lr/Lm, the relation between Lr and Lm can be tuned to create a new optimal voltage ratio between Ub and Ua that equals n*(1+Lr/Lm). As an example for this specific case the relation between Lr/Lm could be 0.20 giving an optimal voltage ratio at $\omega_{res2}$ that equals 1.2*n between Ub and Ua. This gives the possibility to run the bi-directional resonant LLC converter 1 at highest efficiency around $\omega_{res2}$ in discharging mode.

Alternative Embodiments

Figure 5:
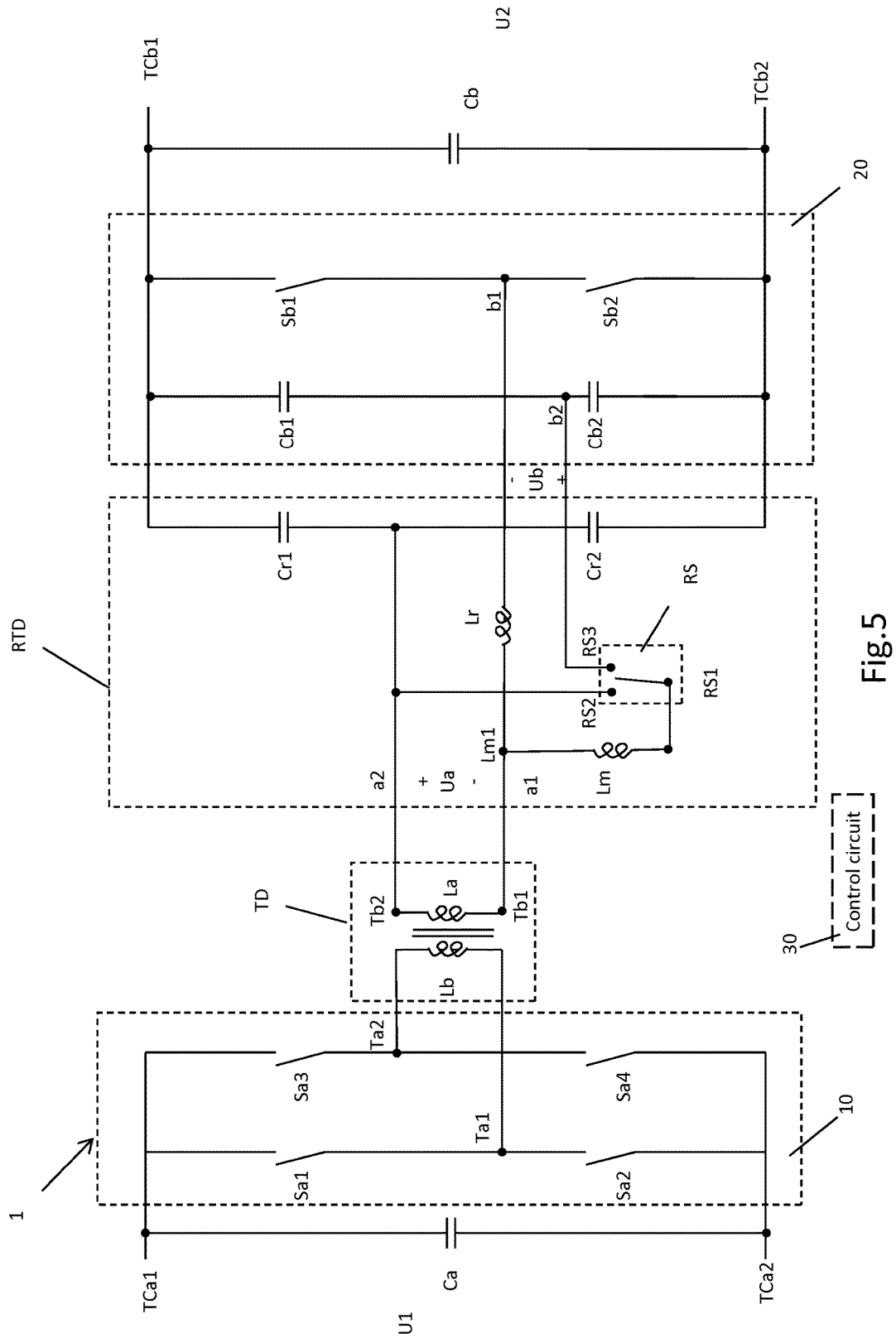
FIG. 5 illustrates a second embodiment of the invention.

It should be noted that the above primary and secondary switching circuits 10, 20 can be half bridge circuits It is now referred to FIG. 5. Here, the secondary switching circuit 20 is a half bridge where the third and fourth switches Sb3, Sb4 of the secondary switching circuit 20 are replaced with capacitors Cb1, Cb2. Accordingly, also the resonant tank device RTD has been amended. Similar to the above embodiment, the configuration switch RS comprises a first switch terminal RS1, a second switch terminal RS2 and a third switch terminal RS3. The magnetizing inductor Lm is connected between the first switch terminal RS1 and the first primary resonant tank terminal a1. The second switch terminal RS2 is connected to the second primary resonant tank terminal a2.

However, in this embodiment, the resonant capacitor Cr of the resonant tank device RTD here comprises a first resonant capacitor Cr1 connected between the second primary resonant tank terminal a2 and the first secondary converter terminals TCb1 and a second resonant capacitor Cr2 connected between the second primary resonant tank terminal a2 and the second secondary converter terminals TCb2. Moreover, the resonant inductor Lr is connected between first primary resonant tank terminal a1 and the first secondary resonant tank terminal b1, and the third switch terminal RS3 is connected to the second secondary resonant tank terminal b2.

Figure 6:
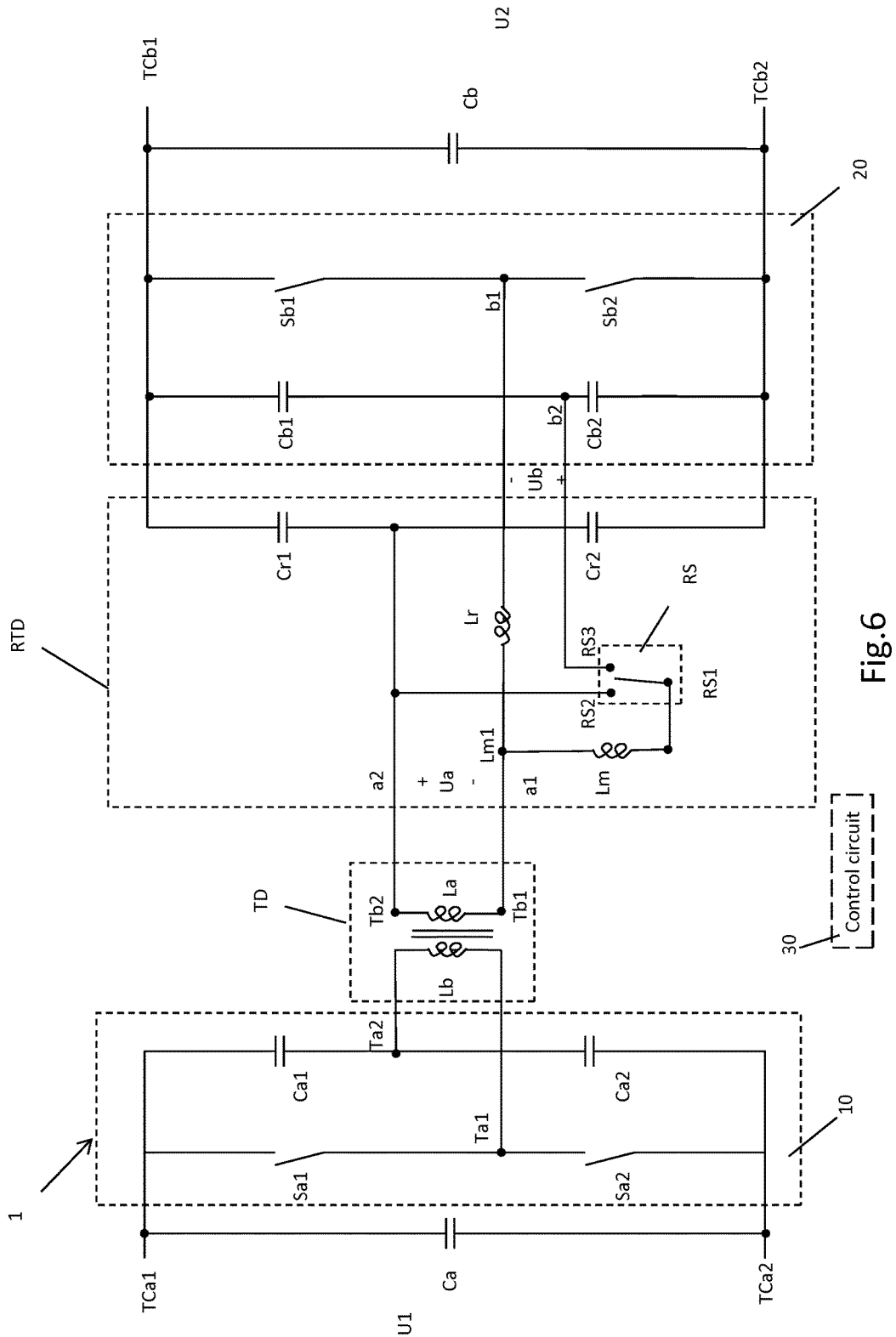
FIG. 6 illustrates a third embodiment of the invention.

It is now referred to FIG. 6. Here the primary switching circuit 10 is also a half bridge where the third and fourth switches Sa3, Sa4 of the secondary switching circuit 20 are replaced with capacitors Ca1, Ca2. In this embodiment, the resonant tank device RTD and the secondary switching circuit 20 are similar to the embodiment shown in FIG. 5.

The invention claimed is:
1. Bi-directional DC-DC resonant converter with bi-directional voltage control, comprising:
   primary converter terminals defining a primary voltage;
   secondary converter terminals defining a secondary voltage;
   a transformer device having primary transformer terminals and secondary transformer terminals;
   a resonant tank device having first and second primary resonant tank terminals defining a primary resonant tank voltage and first and second secondary resonant tank terminals defining a secondary resonant tank voltage, wherein the primary tank terminals are connected to the secondary transformer terminals;
   a primary switching circuit connected between the primary converter terminals and the primary transformer terminals; and
   a secondary switching circuit connected between the secondary resonant tank terminals and the secondary converter terminals;
   wherein the resonant tank device comprises a configuration switch for configuration of the converter between a first state, in which power is transferred from the secondary converter terminals to the primary converter terminals, and a second state, in which power is transferred from the primary converter terminals to the secondary converter terminals;
   wherein the resonant tank device comprises a resonant inductor, a magnetizing inductor and a resonant capacitor connected to the configuration switch;
   wherein a first gain is defined as the ratio between a first harmonic approximation of the secondary resonant tank voltage and a first harmonic approximation of the primary resonant tank voltage when operating at a first series resonance frequency in the first state;
   wherein a second gain is defined as the ratio between a first harmonic approximation of the secondary resonant tank voltage and a first harmonic approximation of the primary resonant tank voltage when operating at a second series resonance frequency in the second state; and wherein the first gain is different from the second gain.

2. Bi-directional DC-DC resonant converter according to claim 1, wherein the second series resonant frequency during the first harmonic approximation in the second state is different from the first resonant series frequency during the first harmonic approximation in the first state.

3. Bi-directional DC-DC resonant converter according to claim 1, wherein the first gain is equal to 1 when operating at the first series resonance frequency in the first state.

4. Bi-directional DC-DC resonant converter according to claim 1, wherein the second gain is determined by the inductance of the resonant inductor and inductance of the magnetizing inductor so that the second gain is equal to (resonant indicator +magnetizing inductor)/magnetizing inductor when operating at the second series resonance frequency in the second state.

5. Bi-directional DC-DC resonant converter according to claim 1, wherein the transformer device has a primary winding connected to the primary transformer terminals and a secondary winding connected to the secondary transformer terminals.

6. Bi-directional DC-DC resonant converter according to claim 1, wherein the configuration switch comprises a first switch terminal, a second switch terminal and a third switch terminal.

7. Bi-directional DC-DC resonant converter according to claim 6, wherein the magnetizing inductor is connected between the first switch terminal and the first primary resonant tank terminal.

8. Bi-directional DC-DC resonant converter according to claim 6, wherein the second switch terminal is connected to the second primary resonant tank terminal.

9. Bi-directional DC-DC resonant converter according to claim 6, wherein the resonant capacitor is connected between the second and third switch terminals.

10. Bi-directional DC-DC resonant converter according to claim 9, wherein the first primary resonant tank terminal is connected to the first secondary resonant tank terminal.

11. Bi-directional DC-DC resonant converter according to claim 6, wherein the resonant inductor is connected between the third switch terminal and the second secondary resonant tank terminal.

12. Bi-directional DC-DC resonant converter according to claim 6, wherein the resonant capacitor comprises a first resonant capacitor connected between the second primary resonant tank terminal and the first secondary converter terminals and a second resonant capacitor connected between the second primary resonant tank terminal and the second secondary converter terminals.

13. Bi-directional DC-DC resonant converter according to claim 12, wherein the third switch terminal is connected to the second secondary resonant tank terminal.

14. Bi-directional DC-DC resonant converter according to claim 6, wherein the resonant inductor is connected between first primary resonant tank terminal and the first secondary resonant tank terminal.

15. Bi-directional DC-DC resonant converter according to claim 6, wherein the first switch terminal and the second switch terminal are connected to each other in the first state; and wherein the first switch terminal and the third switch terminal are connected to each other in the second state.

16. Bi-directional DC-DC resonant converter according to claim 1, wherein the primary switching circuit is a full bridge circuit or a half bridge circuit.

17. Bi-directional DC-DC resonant converter according to claim 1, wherein:
the primary converter terminals are connected to a battery defining a battery voltage; and
the secondary converter terminals are connected to a power supply system defining a system voltage;
an optimal ratio between the system voltage and the battery voltage during charging is different from an optimal ratio between the system voltage and the battery voltage during discharging.

* * * * *